March 10, 1964 M. P. ESKIN ETAL 3,124,156
PRESSURE EQUALIZING APPARATUS
Filed July 11, 1960 2 Sheets-Sheet 1
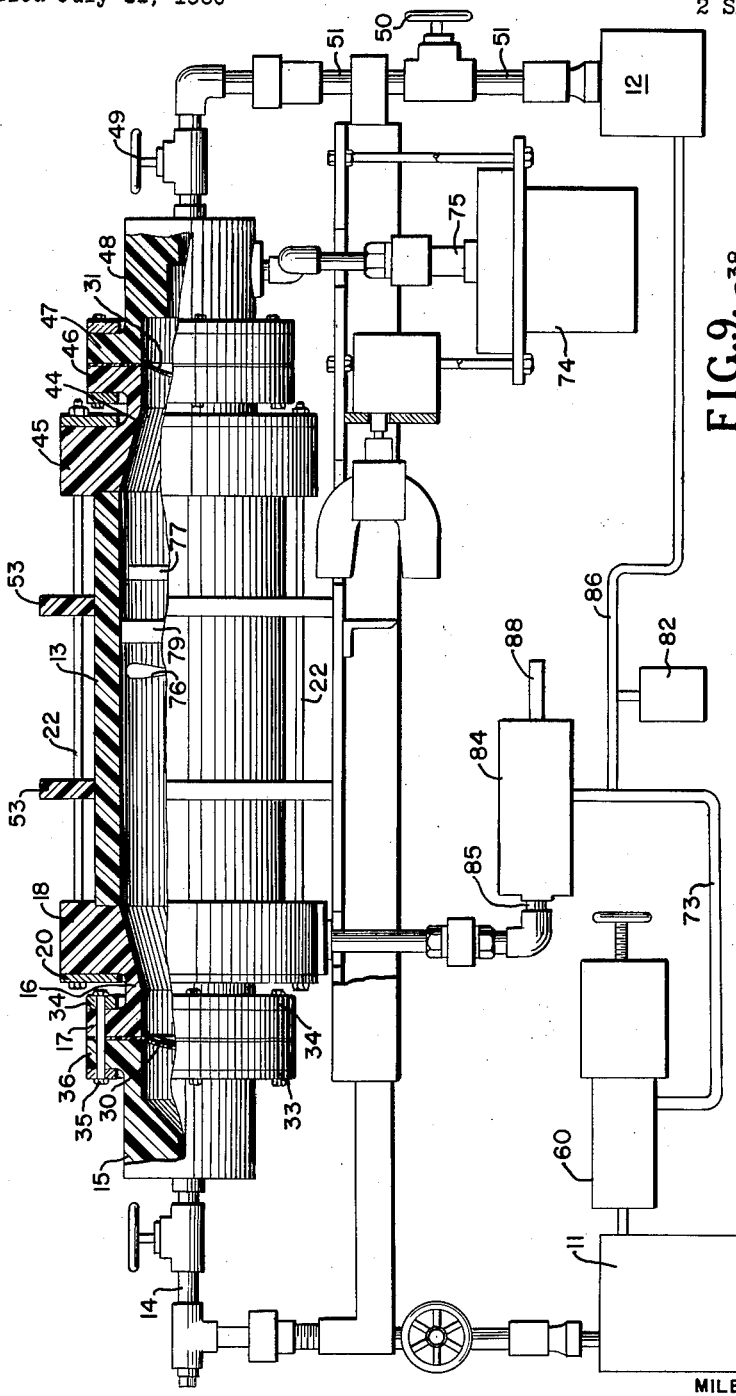
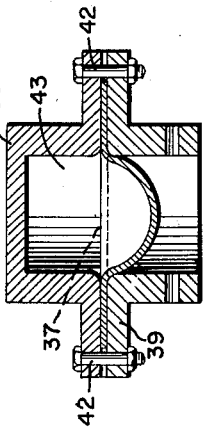
INVENTORS.
MILES P. ESKIN
MARVIN S. WEINSTEIN
BY *W. Q. Quesenberry*
*O. R. Hodges*
*M. W. Gould* ATTYS.

March 10, 1964

M. P. ESKIN ETAL 3,124,156

PRESSURE EQUALIZING APPARATUS

Filed July 11, 1960

INVENTORS.
MILES P. ESKIN
MARVIN S. WEINSTEIN
BY W. O. Quesenberry
O. E. Hodges
Mr. Gould ATTYS.

3,124,156
PRESSURE EQUALIZING APPARATUS
Miles P. Eskin and Marvin S. Weinstein, Silver Spring, Md., assignors to the United States of America as represented by the Secretary of the Navy
Filed July 11, 1960, Ser. No. 42,185
8 Claims. (Cl. 137—559)
(Granted under Title 35, U.S. Code (1952), sec. 266)

The invention described herein may be manufactured and used by or for the Government of the United States of America for governmental purposes without the payment of any royalties thereon or therefor.

This invention relates to a new and improved pressure equalizing apparatus for automatically maintaining equal pressures in two discrete chambers containing dissimilar fluid mediums under pressure to provide a system for the study of the response of underwater ordnance apparatus.

An object of the invention is to provide an apparatus which will establish and automatically maintain equal pressures in separate chambers, one water filled and the other gas filled, with inhibiting diffusion between the two.

Another object of the invention is to provide an apparatus which will maintain equal pressures in two separate chambers, one of which is water filled while the other is gas filled, and to deter diffusion between the two fluids and upon the occurrence of diffusion to provide a visual means of detecting such diffusion.

A further object of the invention is to provide an apparatus which, upon a difference of pressure in either of two discrete chambers connected by said apparatus, will decrease the volume of one of the chambers or its immediately connected elements and simultaneously increase the volume of the other chamber or its immediately connected elements so as to equalize the pressures in the two chambers, by means of a yieldable mass housed in said apparatus between the two chambers.

A still further object of the invention is to provide a pressure equalizing apparatus to maintain equal pressure in two discrete chambers containing different fluids and to inhibit diffusion between the fluids and upon the occurrence of diffusion to provide quick and visual means for indicating such diffusion, and to provide means for establishing pressure in one chamber and for transferring said pressure to the other chamber through a manually operated volume changing device connected to both chambers.

Other objects and many of the attendant advantages of this invention will be readily appreciated as the same becomes better understood by reference to the following detailed description when considered in connection with the accompanying drawings wherein:

FIG. 1 is a longitudinal cross-sectional view of the apparatus as connected to the chambers, with certain parts shown diagrammatically;

FIG. 9 is a sectional view of the diaphragm former.

Figure 2:
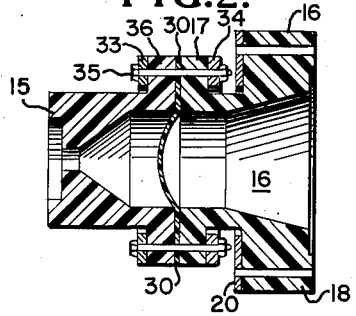
FIG. 2 is a cross-sectional view of the plastic film mount.
Figure 3:
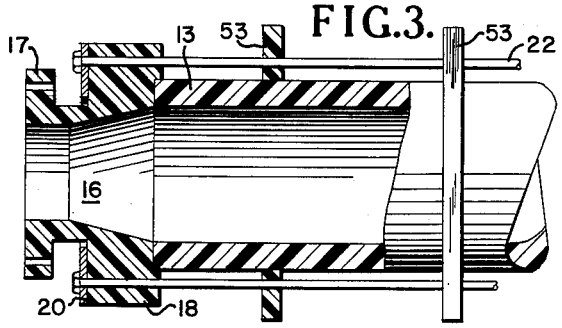
FIG. 3 is a cross-sectional view of the end joint of the apparatus.

Referring to the drawings wherein the like parts are designated by like numerals throughout the several views, the apparatus consists of a water filled system including a chamber, a gas filled system including a second chamber, a transparent vessel connecting the systems, and diaphragms or flexible barriers, pistons and sections of pipe and tubing.

Referring to FIG. 1 a water filled chamber is diagrammatically illustrated at 11 while a chamber filled with $CO_2$ is indicated at 12. The chamber 11 is utilized as a test chamber for underwater ordnance apparatus.

A transparent pressure vessel 13, here shown made of a plastic material suitable for the purpose such, for example, as Lucite, forms a direct connection between chambers 11 and 12. A tube 14 communicating with chamber 11 is connected to vessel 13 through a transparent end cap 15 which is joined to a transparent collar 16. The collar 16 is securely welded to the vessel 13 but could be connected in any serviceable manner. It is advantageous to weld the collar 16 to the vessel in the manner shown in FIG. 7 and such welding operation will be described in greater detail hereinafter. The collar 16 is formed with end flanges, 17 on the cap side and 18 on the vessel side. The flange 18 is larger than the flange 17 and is reinforced with a brass washer or ring 20 which serves as a bearing plate for reinforcing rods 22.

Figure 8:
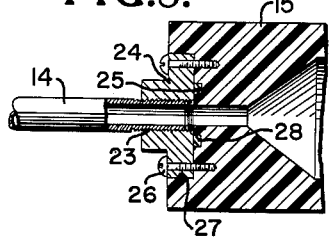
FIG. 8 illustrates the connections between pipes and plastic container.

The end cap 15 is connected to the pipe 14 by means of a special adaptor 24 particularly shown in FIG. 8. The pipe 14 is threaded into a tapered threaded opening 23 of the adaptor 24. The adaptor is bolted over an O ring groove 25 in the end cap by bolts 26 which pull the adaptor into the circular recess 27 of the end cap 15 and into sealing engagement with O ring 28 seated in groove 25. All pipe connections into plastic vessels which form a part of this invention will be made substantially in the same manner.

A flexible diaphragm 30 is mounted between the flange 36 of the end cap 15 and the flange 17 of the collar 16. Washers 33 and 34 serve as bearing plates for reinforcing bolts 35 in respective flanges 36 and 17 which secure the end cap 15 to the collar 16. The flexible diaphragm 30 and its companion diaphragm 31 (to be specifically located later) are fabricated from a six-mil thick polyvinylchloride plastic film (trade name 134 Vinylfilm from Goodyear Tire and Rubber Co.) into a domed or hemispherical shape with a planar annular peripheral base. This plastic is highly flexible and but slightly pervious to the passage of both water vapor and $CO_2$. Permeability to $CO_2$ gas$\simeq$970$\times$10$^{-6}$ g./24 hrs./m.$^2$/mm. thick/cm. Hg at 21° C. 0% RH. Permeability to water vapor$\simeq$0.35 g./24 hrs./m.$^2$/mm. thick/cm. Hg at 25° C. FIG. 9 illustrates the method of forming the flexible diaphragms.

Referring particularly to FIG. 9, the plastic film 37 (shown in dotted lines) is placed between upper section 38 and lower section 39 of a mold and firmly held in place by bolts 42. The film forms a flexible wall for the upper section of the mold and provides a closed interior 43. The interior is connected to an air supply leg of a valve (not shown) and the pressure of the interior space 43 is raised to extend the plastic film for the reason that the lower mold is open to the atmosphere. Heat is simultaneously applied to the mold and a gradual expansion of the gases within the interior of the upper section will form the film from the shape shown in dotted lines to a dome or hemispherical shape with a flat periphery. The film and mold are allowed to cool and the diaphragm removed. These diaphragms are the diaphragms 30 and 31 of FIGS. 1–8.

The diaphragm is positioned between the flange 36 of the end cap 15 and the flange 17 of the collar 16 to seal one end of the transparent vessel 13.

The other end of the transparent vessel has a collar 44 formed with a large flange 45 and a smaller flange 46. The collar 44 is similar to the collar 16. The flexible diaphragm 31 is identical with diaphragm 30 and mounted between the flange 46 of the collar and a flange 47 of an end cap 48 which is connected to a chamber 12 through valves 49 and 50 and pipe section 51, the diaphragms 30 and 31 being mounted in phase so that the convex sides of the dome section extend in the same direction.

The collar 45 is welded to the vessel 13 as hereinafter described and the collar 45 and end cap 44 are provided with brass rings or washers similar to the washers of their companion members 16 and 15 and also bolted similarly. These washers or rings eliminate stress concentrations on the plastic flanges and thus the flexible diaphragms 30 and 31 are free of any disturbing pressures and moreover are clearly visible through the clear plastic flanges.

To reinforce the transparent vessel 13 and to add extra strength thereto, two plastic rings 53 are shrunk fit at intervals over the length of the vessel. This structure will practically prevent side expansion when the vessel is pressurized. The four reinforcing rods 22 pass through holes in the rings 53 to add to the rigidity of the vessel.

Figure 7:
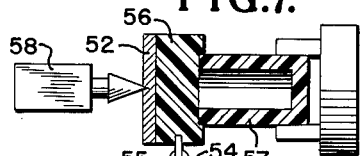
FIG. 7 illustrates the welding process.

The welding of the plastic vessel 13 to the flanges 18 and 45 is done substantially as illustrated in FIG. 7. A piece 56 to be welded is mounted on a tailstock of a lathe and a steel rod 54 carried by tool post 55 inserted in a hole in the piece 56 to prevent rotation. A second cylindrical piece 57 to be welded and carried by the chuck is brought into contact with the face of piece 56, a groove being cut into the face of piece 56 to prevent relative lateral movement of the piece 56 with the tubular piece 57. The piece 57 mounted in the chuck is brought into engagement with piece 56 at the groove and pressure applied through the tailstock 58 bearing against a metal disk 52 which in turn bears against piece 56. The lathe is then run at approximately 350 r.p.m. until the joint has become molten at which time the rod 54 is removed and the piece 56 allowed to rotate with the piece 57. Pressure is maintained after the rotation is stopped, until the pieces are cool.

The chamber 11, the pipes, valves and end cap 15 to the flexible diaphragm 30 is filled with water to which has been added a quantity of bromcresol purple to form a ¾% solution. Bromcresol purple is a chemical indicator which has a pH range of 5.2–6.8. It has a deep purple color in a basic or slightly acidic solution and yellow-orange color in a more acidic solution. This coloring of the solution may be observed through the sides of the end cap.

Also connected to the chamber 11 is a cylinder 60 having mounted therein a piston 61 carrying sealing rings 62. The cylinder is also filled with the bromcresol solution up to the head end of the piston. This makes a completely filled liquid containing system from the chamber 11 to contact with the flexible diaphragm and the piston head, both of which are yieldable.

The chamber 12 and its connected pipes and end cap up to the flexible diaphragm 31 are filled with carbon dioxide gas ($CO_2$). Included in this system are the space behind the piston 61 in the cylinder 60 and the space behind piston 83 in a cylinder 84 as well as the space in a silica gel container 74 and their connecting pipes. This forms a completely gas filled system.

The volume within the plastic transparent vessel 13 between the diaphragms and into the cylinder 84 to the head side of the piston 83 is filled with a saturated aqueous solution of barium hydroxide [$Ba(OH)_2$] plus an undissolved excess of $Ba(OH)_2$.

Figure 4:
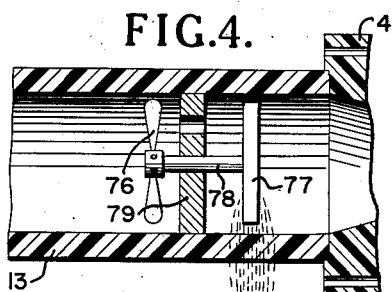
FIG. 4 is a diagrammatical view of the agitator.

In FIG. 4 an agitator for the barium hydroxide solution is illustrated. The agitator is made up of an axle 78 mounted for rotation in a plastic partition 79 located in the transparent vessel 13 and a six-bladed fan 76, which is affixed to one end of the axle while the other end supports an Alnico 5 bar magnet 77. Below the axis and outside of the vessel 13, a motor 80 carries a U-shaped magnet 81, the U-shaped magnet being mounted directly below the bar magnet. Rotation of the U-shaped magnet rotates the Alnico bar magnet as the magnets are sufficiently close as to have interacting fields.

A source of supply 82 for $CO_2$ gas governed by a regulator pressurizes the volume of gas contained within the chamber 12 and its system. This pressure is transmitted through the pipes 73 and through the flexible diaphragm 31, the vessel 13 and diaphragm 30 to the water filled system containing tank 11. Thus the pressure, controlled by the regulator on the source of gas supply, is simultaneously translated throughout the water filled system and the gas filled system and the barium hydroxide solution contained in the vessel 13 between the diaphragms. The flexible diaphragms transmit pressure with little appreciable loss as long as they are in unstrained positions.

Volumetric expansion or contraction of the water caused by temperature fluctuations or any possible leakage from the water chamber is automatically compensated for by movement of the diaphragms. These diaphragms are preferably approximately 2½ inches in diameter at the base of the dome and will accommodate a volumetric change of approximately 130 cubic centimeters during travel from one extreme position to the other. The size of the diaphragms is kept as small as will be consistent with sufficient change in volume to keep the effective area which might diffuse gas to a low value. Any gas leakage would be automatically taken care of by the controlled pressure supply.

Should $CO_2$ gas diffuse through the diaphragm 31 it will enter the saturated solution of barium hydroxide and form barium carbonate which will precipitate as a white solid ($BaCO_3$). After considerable time has elapsed it is possible that the barium hydroxide will become exhausted and the $CO_2$ gas may diffuse through diaphragm 30 into the water system. The water in the water system is colored by bromcresol-purple and this color is clearly distinguishable through the plastic flange of end cap 15. The gas ($CO_2$) entering the water system will dissolve in the water and acidify the solution sufficiently to turn the color of the solution yellow. When this occurs the system must be shut down and the chemical trap regenerated. By measuring the quantity of excess $Ba(OH)_2$ in the saturated solution the system may be set up to run for a limited period which can be calculated closely.

Where the water chamber is used as a test chamber with compliant specimens mounted in side ports or installed within the tank as set forth in greater detail in a copending joint application of the same inventors with a third inventor, Serial No. 34,344 filed June 6, 1960, the pressurizing operation might create a volume displacement which would exceed the capacity of the flexible diaphragms by several times. To prevent such operation from limiting the capacity of the pressure equalizing apparatus, a large manually controlled displacement piston 61 carried in cylinder 60 and adjusted by the piston rod 65 (illustrated in detail in FIG. 5) is used. The cylinder 60 is connected to the water system at the head end of the piston and connected to the $CO_2$ gas system at the tail end of the piston. The piston head is formed with a pair of spaced sealing rings 62 with the space between the rings being grooved as at 63 and vented to the atmosphere by passageway 64 in a piston rod 65. The end of the piston rod carries a bearing mount 66 which connects the rod to a threaded shaft 67 and permits the piston to be moved longitudinally through the cylinder by turning the shaft which is threaded into the end wall of a housing 68 which covers the bearing mount.

Figure 5:
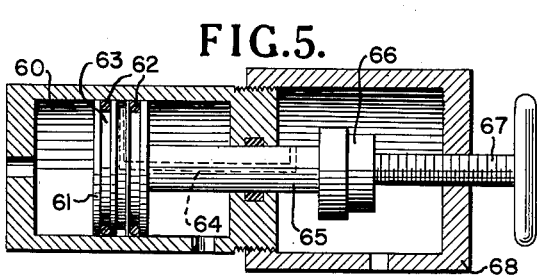
FIG. 5 is a cross-sectional detail view of the regulating piston.

If during a pressurizing sequence, the diaphragms reach the limit of their free travel, or their displacement without strain on the diaphragms, the piston may be adjusted inward, displacing water and forcing the diaphragms back to the initial positions. This can be done without any change in pressure. As shown in FIGS. 1 and 5 the volume in the cylinder at the rear of the piston is filled with gas and connected with the $CO_2$ gas filled system which is under pressure. This equalizes the force on each side of the piston and facilitates moving the piston. It also eliminates any change in the size of the gas volume during movement of the piston. An increasing volume within the cylinder caused by moving the piston is balanced by a decreased volume caused by movement of the diaphragm. Thus any pressure consistent with the strength of the containers may be obtained by a series of adjusting cycles, employing the diaphragms and the piston. The double seal on the piston head with an atmospheric vent between the seals prevents leakage of the gas through the seals into the water system.

Figure 6:
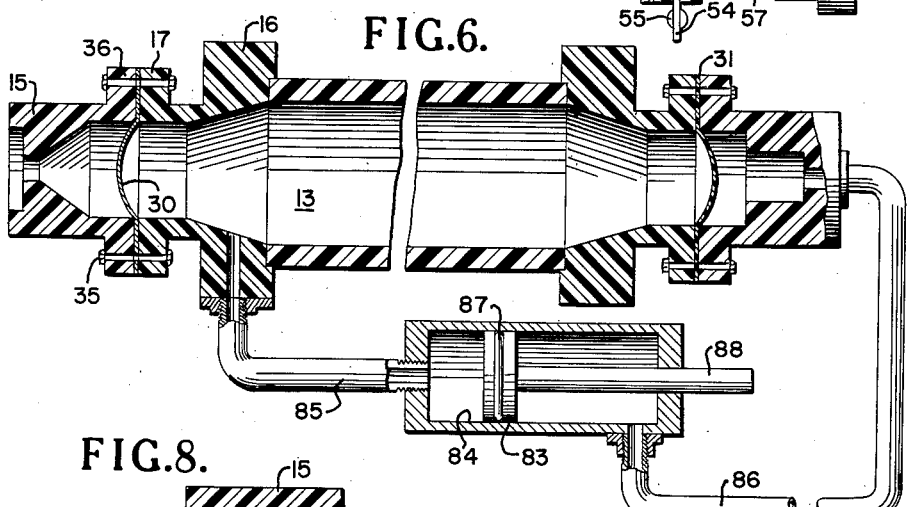
FIG. 6 is a diagrammatical view of a phase regulating piston.

A second smaller piston 83 similar to that shown in FIG. 5 is illustrated in FIG. 6. The construction of this piston 83 and cylinder combination is similar to that of piston 61 except that the cylinder 84 on the head end of the piston is connected to the transparent vessel 13 through the pipe 85 and on the rear end of the piston to the $CO_2$ system through the pipe 86. The piston 83 is also formed with a seal 87 which prevents leakage of the gas ($CO_2$) into the barium hydroxide solution contained in vessel 13. A piston rod 88 and shaft provide manually operative means for adjusting the piston 83. The purpose of this piston is to regulate the phase of the flexible diaphragms. When $CO_2$ gas diffuses through the diaphragm 31 and forms $BaCO_3$ (barium carbonate) at a faster rate than moisture diffuses out through the same diaphragm into the $CO_2$ end cap, the two diaphragms move to an out-of-phase relation as seen in FIG. 6. Outward movement of the piston 83 will rephase the diaphragms since the back volume of the piston is connected into the gas ($CO_2$) filled system.

A silica-gel clear plastic container 74 is connected into the gas-filled system at the end cap 48 by pipe 75 and effectively absorbs the moisture vapor which diffuses through the diaphragm 31. The desiccant (silica-gel) is clearly visible through the sides of the container and is of a deep blue color which changes to a light pink upon saturation. The container is separable to permit the desiccant to be replaced.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In the combination of a liquid filled system with a gas filled system, a pressure equalizing apparatus comprising an elongated vessel filled with a liquid, a flexible diaphragm carried at each end and within said vessel and sealing the vessel and liquid contents, the ends of the vessel beyond the diaphragms being connected respectively to the liquid filled system and the gas filled system, and means establishing and maintaining a constant pressure on the gas filled system, said pressure being transferred through said diaphragms and said vessel contained liquid to the liquid filled system.

2. A pressure equalizing apparatus according to claim 1 wherein the flexible diaphragms are dome shaped and mounted in phase relationship and accommodate a change of volumetric capacity from one system to the other by flexing.

3. A pressure equalizing apparatus according to claim 2 including manually operated means for restoring the flexible diaphragms within the vessel to phase relationship if said phase relation is changed by the diffusion of gas through the diaphragm connected to the gas filled system.

4. A pressure equalizing apparatus according to claim 1, including moisture removing means connected into the gas-filled system.

5. A pressure equalizing apparatus according to claim 1 including a telltale color material in the liquid in the elongated vessel to indicate any diffusion of gas from the gas containing system into the elongated vessel.

6. In the combination of a liquid filled system with a gas filled system, a pressure equalizing apparatus comprising an elongated vessel connected at one end to the liquid filled system and connected at the other end to the gas filled system, a dome shaped flexible diaphragm at each end of said elongated vessel sealing off a central section within the elongated vessel, a basic saturated liquid solution within said sealed off central section, said solution containing a constituent which will react with said gas to produce a precipitate upon diffusion of the gas through the flexible diaphragm adjacent the gas filled system into the central section of the elongated vessel, the diaphragms being arranged so that they are in phase, with the convex portions extending in the same direction, manually operated means connected into the central section and the gas filled system for maintaining the flexible diaphragms in phase, means connected in the gas filled system for maintaining a constant volume and pressure in said gas filled system, means in the gas filled system for removing water vapor therefrom, means within the central section indicating any diffusion of gas from the gas filled system to the central section, means included with the water vapor removing means indicating saturation of said water vapor removing means, and means for agitating said central section contained liquid.

7. A pressure equalizing apparatus according to claim 6 wherein the agitating means is driven from outside the vessel by a magnetic coupling device.

8. A pressure equalizing apparatus according to claim 7 wherein the magnetic coupling device comprises a U-shaped magnet driving member and a bar-magnet driven member connected to said agitating means.

References Cited in the file of this patent

UNITED STATES PATENTS

| 1,731,519 | Bastian | Oct. 15, 1929 |
| 2,138,654 | Doran | Nov. 29, 1938 |
| 2,317,594 | Ericson | Apr. 27, 1943 |
| 2,341,501 | Greenwell et al. | Feb. 8, 1944 |
| 2,671,424 | Herring | Mar. 9, 1954 |
| 2,702,561 | Geffroy | Feb. 22, 1955 |

FOREIGN PATENTS

| 585,322 | Great Britain | Feb. 4, 1947 |